US006105934A

United States Patent [19]

Rober

[11] Patent Number: 6,105,934

[45] Date of Patent: Aug. 22, 2000

[54] TRANSPORTABLE SERVICE LIFT ASSEMBLY

[75] Inventor: Dennis J. Rober, LaSalle, Mich.

[73] Assignee: Tilt-Tech Corp., Maumee, Ohio

[21] Appl. No.: 09/313,755

[22] Filed: May 27, 1999

Related U.S. Application Data

[60] Provisional application No. 60/090,843, Jun. 26, 1998.

[51] Int. Cl.$^{7}$ .................... B60P 1/00

[52] U.S. Cl. .................... 254/2 R; 254/934

[58] Field of Search .................... 254/89 H, 2 R, 254/90, DIG. 9, 93 R

[56] References Cited

U.S. PATENT DOCUMENTS

| | | | |
|---|---|---|---|
| 1,263,954 | 4/1918 | Sollender . | |
| 1,265,688 | 5/1918 | Lively . | |
| 1,477,332 | 12/1923 | Elzey . | |
| 1,820,267 | 8/1931 | Rox . | |
| 2,556,929 | 6/1951 | Mervine . | |
| 3,190,395 | 6/1965 | Lill . | |
| 3,294,367 | 12/1966 | Liskey . | |
| 3,386,703 | 6/1968 | Thumma . | |
| 4,050,673 | 9/1977 | Nishimura | 254/89 H |
| 4,084,790 | 4/1978 | Molnar | 254/90 |
| 4,134,501 | 1/1979 | Tune . | |
| 4,238,114 | 12/1980 | Migliorati . | |
| 4,420,054 | 12/1983 | Caris . | |
| 4,445,665 | 5/1984 | Cray | 254/90 |
| 4,486,006 | 12/1984 | Fawdry . | |
| 4,673,328 | 6/1987 | Shiels . | |
| 4,784,400 | 11/1988 | Hofius | 254/93 H |
| 4,919,234 | 4/1990 | Pearson | 254/93 H |
| 5,015,146 | 5/1991 | Barnes et al. . | |
| 5,141,371 | 8/1992 | Pish . | |
| 5,197,714 | 3/1993 | Metzen . | |
| 5,203,153 | 4/1993 | Van Zee et al. . | |
| 5,236,065 | 8/1993 | Isogai . | |
| 5,253,973 | 10/1993 | Fretwell . | |
| 5,340,267 | 8/1994 | Stoll et al. . | |
| 5,641,150 | 6/1997 | Rober . | |

OTHER PUBLICATIONS

Catalog pp. 6 and 7 from "Welded Cylinders—Fluid Power" for Chief (R) WP Pistons, undated.

*Primary Examiner*—David A. Scherbel
*Assistant Examiner*—Daniel Shanley
*Attorney, Agent, or Firm*—Emch, Schaffer, Schaub & Porcello Co., L.P.A.

[57] ABSTRACT

A transportable service lift assembly for use in raising and lowering a vehicle from one position to a second position. The transportable service lift assembly comprises a first and second longitudinally extending frame members in opposed relationship to each other and supporting a platform, a first and second removably mounted wheel assemblies connected to the longitudinally extending frame member where a portion of the wheel assemblies extend below the frame member, a first lifting assembly connected to a first end of at least one frame member, and a second lifting assembly connected to a second or opposed end of at least one frame member. The first and second lifting assemblies raise and lower the longitudinally extending frame members so that the wheel assemblies can be removed from the frame members when the lifting assemblies are in a raised position and so that such vehicle can be positioned on the platform when the lifting assemblies are in a lowered position.

5 Claims, 3 Drawing Sheets

TRANSPORTABLE SERVICE LIFT ASSEMBLY

This application claims benefit of Ser. No. 60/090,843 filed Jun. 26, 1998.

BACKGROUND OF THE INVENTION

The present invention is directed to a transportable service lift which is especially useful in lifting and transporting fork lifts, light trucks and other such vehicles. The present invention is an improvement over a prior art service lifts sold by Tilt-Or-Lift, Incorporated of Maumee, Ohio, including the Model V-13-A service lift. The prior art service lift is designed to allow complete access to the underparts of vehicles such as fork lifts, industrial trucks and motor vehicles for lubrication, repair or part replacement. When using the prior art service lift, the vehicle is driven onto the service lift. The vehicle is raised to an elevated position so that maintenance can be performed while standing under the vehicle. This prior art service lift is usually bolted or otherwise secured to the floor and is not easily transported or moved to a different area. Accordingly, the vehicles that are to be serviced must be brought to the lift for servicing needs. For many industrial vehicles, such as fork lifts, it is difficult and time consuming to either drive or transport the vehicle to the lift for servicing.

The primary object of the present invention is to provide an improved service lift that is transportable and can be taken to where the vehicles are located to perform service work. The transportable service lift includes a removable wheel and axle assembly so that the service lift is easily transportable, and yet is very stable when the service lift is used to service a vehicle.

SUMMARY OF THE INVENTION

The present invention is a transportable service lift that can be moved to the desired location and then used to service a vehicle. During service work, the wheels and axle assemblies are removed and the vehicle that is being serviced is raised to an elevated position so that all maintenance can be performed while standing adjacent or under the vehicle.

The improved service lift of the present invention has a frame and at least one wheel and axle assembly on opposing sides of the frame. The wheel and axle assemblies allow the transportable service lift of the present invention to be readily moved from one location to a different location. The wheel and axle assemblies are removably mounted on the frame such that the wheel and axle assembly can be removed from the frame. The transportable service lift also includes lifting or jacking mechanisms mounted on the transportable service lift. The lifting or jacking mechanisms allow the frame of the service lift to be raised or lowered so that the wheel and axle assemblies can be removed from the frame. The lifting or jacking mechanisms also allow the service lift frame to be lowered to ground level to allow the vehicle to be driven onto a platform on the service lift. The platform is operatively connected to a further lifting device which raises the vehicle to a suitable elevated position so that the undersides of the vehicle can be readily serviced.

DETAILED DESCRIPTION OF THE PREFERRED EMBODIMENT

Figure 4:
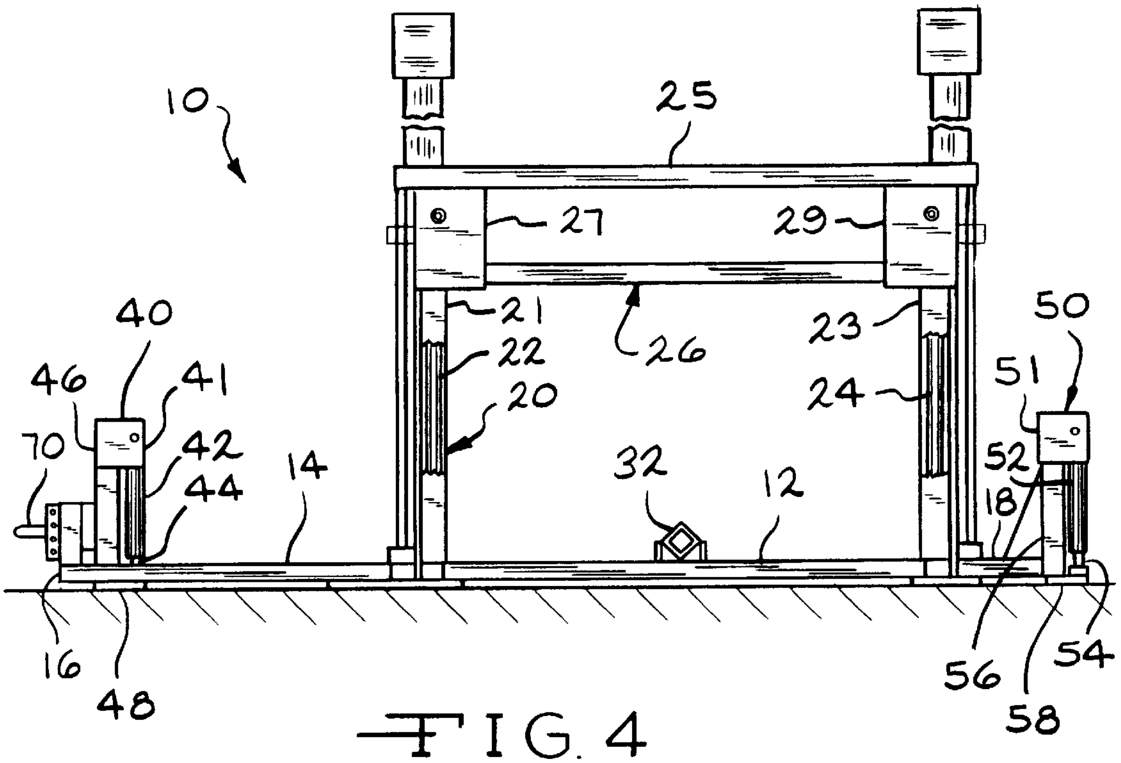
FIG. 4 is a side elevation view, partially broken away, of a transportable service lift in a fourth or lowered position.

A transportable service lift, according to the present invention, is generally indicated in the drawings by the reference numeral 10. The transportable service lift 10 includes first and second longitudinally extending frame members 12. In the embodiment shown, the frame members 12 are in opposed parallel relationship. One end of the frame members 12 are operatively connected to longitudinally extending rails 14 which converge as the rails extend from the frame members 12 and terminate at an apex or first end 1 6. Mounted on the frame members 12 is a service lift device 20 which includes hydraulic cylinders 22 and 24 mounted in at least one set of vertical support members 21 and 23, respectively. The hydraulic cylinders 22 and 24 raise and lower a floor or platform 26 of the service lift 10. When the platform 26 is in a lowered position, the platform 26 is positioned adjacent the frame members 12. The service lift device 20 further includes at least one horizontal stabilizer or support member 25 which extends between the vertical support members 21 and 23. The service lift device 20 also includes safety locks, generally shown as 27 and 29 on each vertical support member to provide additional safety and security to the platform 26 when the platform 26 is in a raised position, as best seen in FIG. 4. The lift portion of the invention utilizes a standard industrial vehicle lift such as the model V-13A service lift sold by Tilt-Or-Lift, Incorporated of Maumee, Ohio. Since a standard and commercially available lift is utilized, the features of this lift will not be described in detail.

Figure 3:
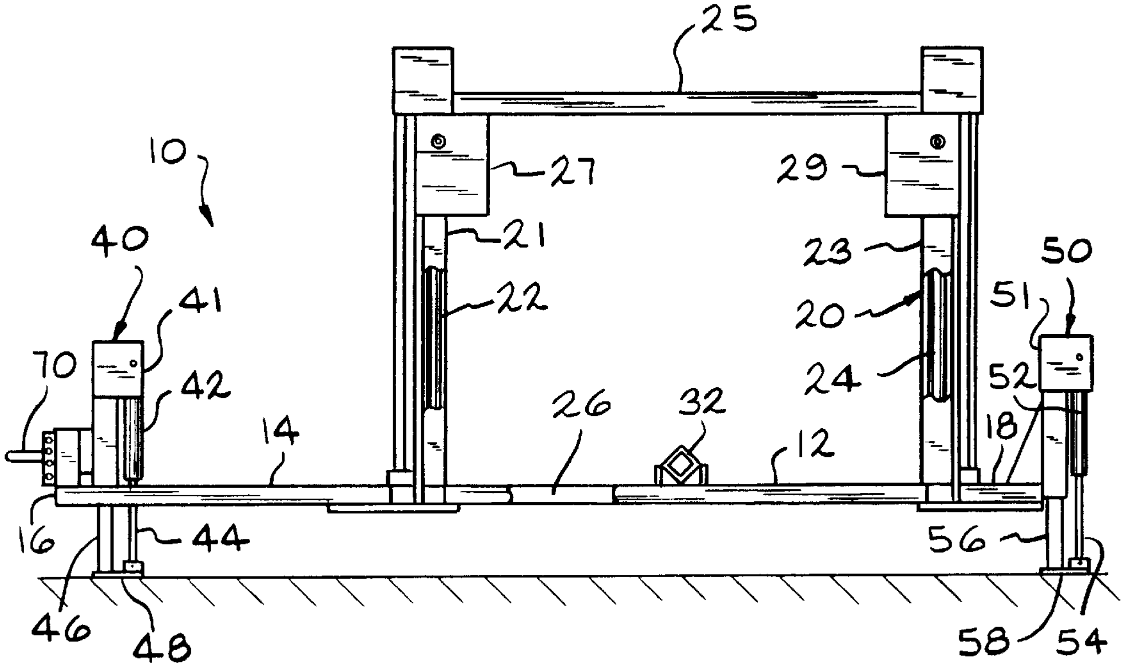
FIG. 3 is a side elevation view, partially broken away, of a transportable service lift in a third position, with the wheels detached.
Figure 5:
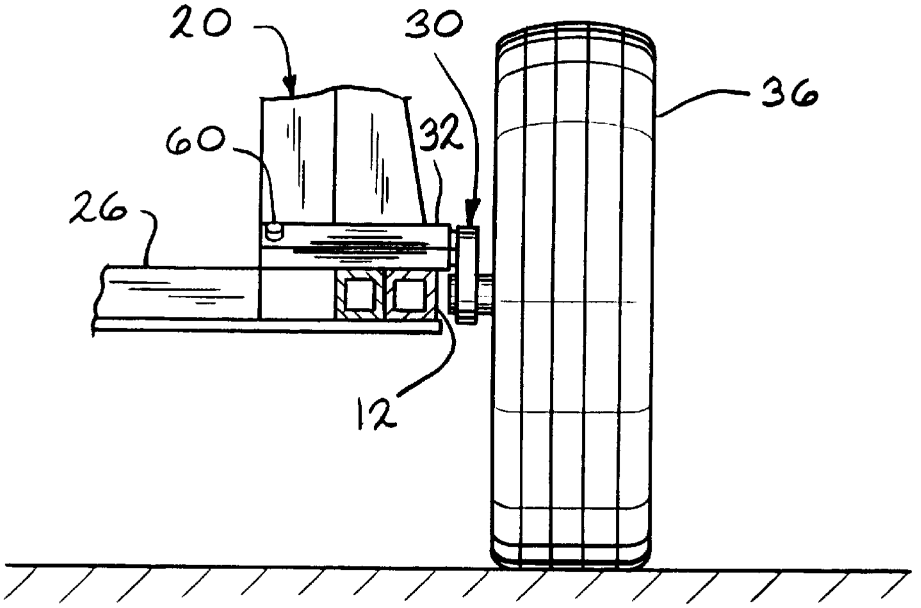
FIG. 5 is a cross-section view taken along the lines 5—5 in FIG. 1.

At least one wheel and axle assembly 30 is operatively mounted to each longitudinally extending frame member 12. FIG. 5 shows the wheel and axle assembly 30 mounted on the frame member 12. A collar or receiving member 32 is mounted on the frame member 12 in a generally perpendicular direction to the longitudinal axes of the frame member 12. As shown in FIGS. 3 and 4, the collar 32 can have a generally square or rectangular shape such that the wheel assembly 30 slideably mounts therein. However, other shapes can be utilized for the collar 32.

Figure 6:
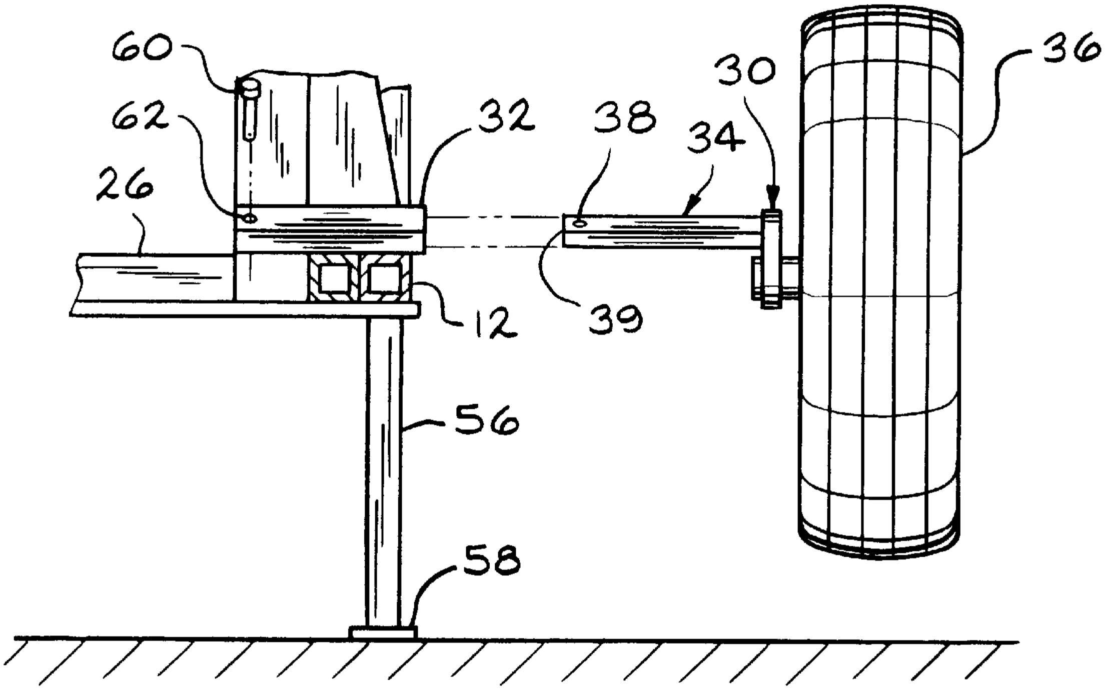
FIG. 6 is a view similar to FIG. 5 showing the removal of the wheel and axis from the service lift frame.

The wheel and axle assembly 30 comprises an axle 34 which extends from a wheel 36. The end 39 of the axles 34 that is in spaced apart relationship to the wheel 36 has an opening 38. As shown in FIG. 6, the axle 34 slideably mounts within the collar 32 and is held in position with a pin or locking mechanism 60. The pin 60 extends through an opening 62 in the collar 32 and through the opening 38 in the axle 34. The axle 34 has a square shape such that the axle 34 matingly engages the interior sides of the collar 32. The axle 34 can also have other shapes as long as the axle matingly engages the collar 32 to secure the axle to frame member 12. It is to be understood that the collar 32 can be positioned in any suitable manner of the frame member 12 such that the axle 34 matingly engages the collar 32 and is held in the collar 32.

The transportable service lift 10 further includes at least one lifting or jacking mechanism such as a first hydraulic lift assembly 40 which is operatively mounted on the end 1 6 of the frame members 14. The first hydraulic lift assembly 40 comprises a hydraulic cylinder 42 having a rod 44 that is connected to a piston (not shown) in the cylinder. The hydraulic cylinder 42 is operatively connected to a source of hydraulic fluid under pressure. The hydraulic fluid causes the piston to move in the cylinder to advance and retract the rod 44. The rod 44 is operatively connected to a support member 46 by a foot or bracket 48.

At least one, and preferably two, second hydraulic lift assemblies 50 are mounted at the end 18 of the frame members 12 that is spaced apart from the rails 14. Each second hydraulic lift assembly 50 includes a hydraulic cylinder 52 having a rod 54 that is connected to a piston (not shown) in the cylinder. The second hydraulic lift assemblies are essentially the same as and function in the same manner as the previously described first hydraulic lift assembly. The rod 54 is operatively connected to a support member 56 by a foot or bracket 58.

It should be understood that changes can be made with respect to the number and sizes of the wheels and wheels assemblies provided on the frame member 12. Similarly, changes can be made to the number and sizes of individual hydraulic lift assemblies 40 and 50 that are used to lift the frame 12.

Figure 1:
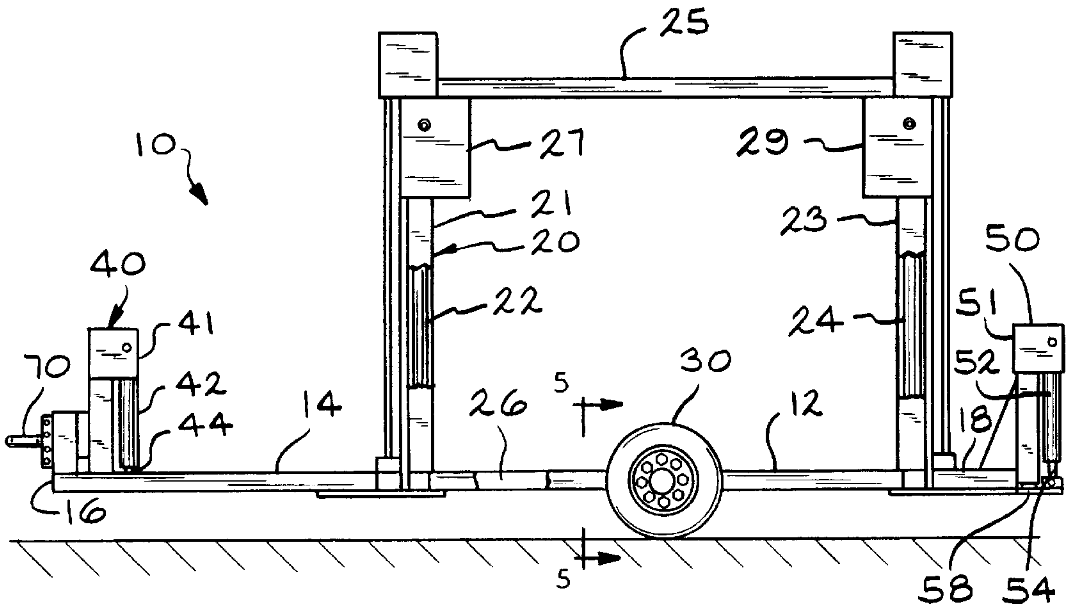
FIG. 1 is a side elevation view, partially broken away, of a transportable service lift in a first position.
Figure 2:
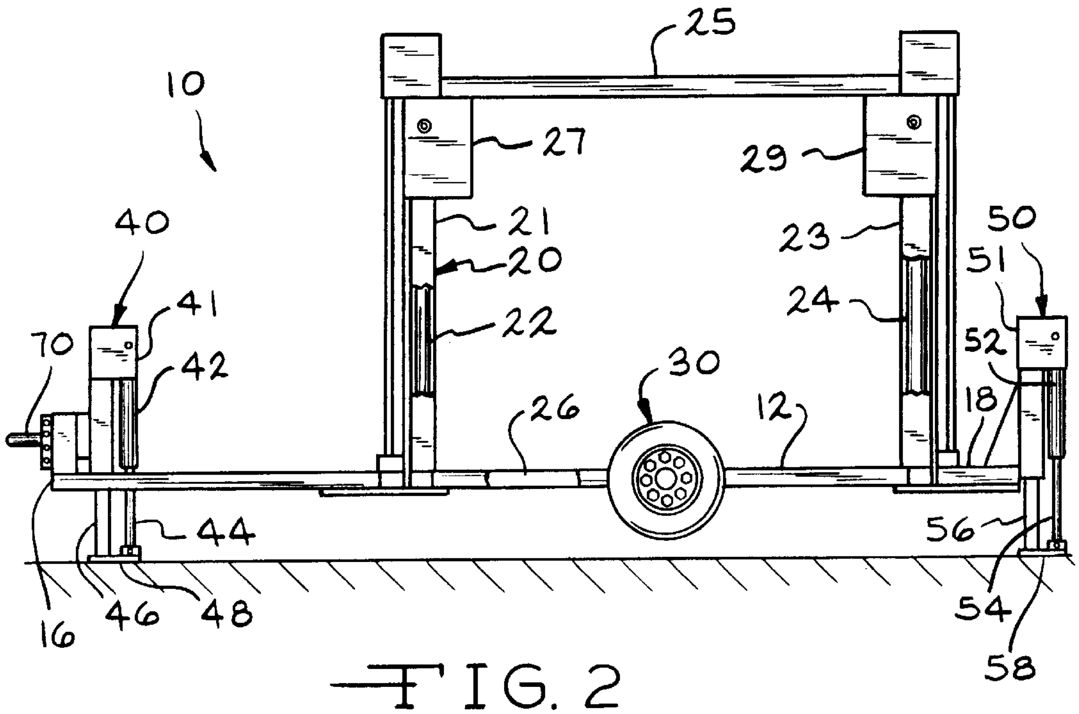
FIG. 2 is a side elevation view, partially broken away, of a transportable service lift in a second or elevated position.

Referring now to FIG. 2, the first hydraulic lift assembly 40 is supplied with hydraulic fluid to cause the hydraulic rod 44 extends from the cylinder 42. The movement of the rod causes the support member 46 to be extended also, thereby raising the end 1 6 of the transportable service lift 10. Similarly, when the second hydraulic lift assemblies 50 are supplied with hydraulic fluid to cause the rod 54 extends from the cylinder 52, this extends the support member 56 and raises the end 18 of the transportable service lift 10. The first and second hydraulic lift assemblies 40 and 50 can be operated simultaneously, or sequentially, to raise the front end 1 6 and the rear end 18 of the service lift 10 such that the frame members 12 and the wheel assemblies 30 are raised and the wheel assemblies 30 are no longer in contact with the ground.

Referring now to FIG. 3, the transportable service lift 10 is shown with the wheel and axles assemblies 30 removed and the first and second hydraulic lifts assemblies 40 and 50 in the raised position. FIG. 4 shows the transportable service lift 10 with the first and second hydraulic lift assemblies 40 and 50 in a lowered position. Shown in phantom is the platform 26 which can be lowered to be adjacent the longitudinally extending frame members 12 so that a fork lift or other vehicle can be driven or loaded onto the platform 26.

The transportable service lift 10 preferably has a hitching mechanism 70, as generally shown in FIGS. 1, 2, 3 and 4, such that the transportable service lift 10 can be easily towed by another vehicle.

In operation, the service lift 10 is attached to a transporting vehicle (not shown) using the hitching mechanism 70 and transported to a location where the industrial vehicles are to be serviced. Once the service lift 10 is positioned in the proper location it is detached from the transporting vehicle. The first and second hydraulic lift assemblies 40, 50 are then activated to extend rod 44 and rods 54 from hydraulic cylinders 42 and 52 respectively. The extending rod 44 causes support member 46 and bracket 48 to also advance in a direction away from the frame member 12. The extending rods 54 cause support member 56 and bracket 58 to also advance. When the brackets 48 and 58 contact the ground or surface around the service lift 10, the rods 44 and 54 can be further advanced to lift the wheels 36 off of the ground. The wheel and axle assemblies 30 can then be removed from the service lift 10 by removing the pins 60 from the collars 32 and the axles 34 and sliding the axles from the collars. Once the wheel and axle assemblies 30 are removed the first and second hydraulic lift assemblies 40, 50 are activated to retract the rods 44, 54. When the rods 44, 54 retract the frame members 12 are lowered until the frame members are supported on the ground or surface around the service lift 10. When the service lift 10 is supported on the ground it is ready to be used to lift heavy industrial vehicles for service work or repairs. Once the service and repair work is completed the lifting process of the service lift 10 can be reversed so that the axle and wheel assemblies 30 can be placed back on the service lift so that the service lift is ready to be transported to another location. Supporting the frame members 12 on the ground provides a very secure base for service lift 10 during its operation. Also, since the wheel and axle assemblies 30 do not have to support the weight of the vehicles that are placed on the service lift, these components can be sized to accommodate only the transporting requirements of the service lift 10.

It is understood that many revisions may be made with respect to the transportable service lift of the present invention described above without departing from the scope of the present invention or from the following claims.

I claim:

1. A transportable service lift assembly for use in raising and lowering a vehicle from one position to a second position, the transportable service lift assembly comprising:

first and second longitudinally extending frame members in opposed relationship to each other and supporting a horizontal platform;

first and second removably mounted wheel assemblies, each wheel assembly operatively connected to one longitudinally extending frame member wherein a portion of the wheel assembly extends below the frame member;

at least one lifting assembly operatively connected to the frame members; the lifting assembly raising and lowering the longitudinally extending frame members whereby the wheel assemblies can be removed from the frame members when the frame members are in a raised position and the frame members can be lower to rest on the ground when the wheel assemblies have been removed; and at least one service lift device operatively connected to the platform, the service lift device raising and lowering the platform in a vertical direction whereby the platform is lowered adjacent the ground when the frame members are resting on the ground;

whereby such vehicle can be positioned on the platform when the lifting assemblies and the service lifting device are in a lowered position.

2. The transportable service lift assembly of claim 1, including at least two lifting assemblies operatively connected to the frame members in opposed relationship.

3. The transportable service lift assembly of claim 1, wherein each lifting assembly includes a hydraulic cylinder and rod operatively connected to a source of fluid under pressure for raising and lower the frame members.

4. The transportable service lift assembly of claim 1, wherein each wheel assembly comprises a wheel operatively connected to an axle, and wherein a receiving member is mounted on each longitudinally extending frame member, each axle being removably positioned in each receiving member.

5. The transportable service lift assembly of claim 4, further including a locking mechanism which extends through the receiving member and the axle for removably locking the wheel assembly onto the frame member.

* * * * *